US012274646B1

(12) United States Patent
Guynup

(10) Patent No.: US 12,274,646 B1
(45) Date of Patent: Apr. 15, 2025

(54) SYSTEM AND METHOD FOR A HYPERBARIC CHAMBER HAVING MIRRORED CONTROLS

(71) Applicant: Luke Guynup, Mobile, AL (US)

(72) Inventor: Luke Guynup, Mobile, AL (US)

( * ) Notice: Subject to any disclaimer, the term of this patent is extended or adjusted under 35 U.S.C. 154(b) by 0 days.

(21) Appl. No.: 18/731,633

(22) Filed: Jun. 3, 2024

Related U.S. Application Data

(63) Continuation of application No. 18/628,641, filed on Apr. 5, 2024.

(51) Int. Cl.
*A61G 10/02* (2006.01)

(52) U.S. Cl.
CPC ...... *A61G 10/026* (2013.01); *A61G 2200/327* (2013.01); *A61G 2203/34* (2013.01)

(58) Field of Classification Search
CPC ........ G05G 2700/18; A61G 10/02–026; A61G 2203/10; A61G 2203/70; A61H 31/02; A62B 31/00; A61B 5/0046; F24H 1/00; F24H 1/08; F24H 9/20; F24H 9/25
See application file for complete search history.

(56) References Cited

U.S. PATENT DOCUMENTS 5,618,126 A * 4/1997 Watt .................... A61G 10/026 403/3
2022/0160566 A1* 5/2022 Ryder .................. A61G 10/026

FOREIGN PATENT DOCUMENTS

KR 102218162 B1 * 2/2021
KR 20230101234 A * 7/2023
WO WO-2023106950 A1 * 6/2023

* cited by examiner

*Primary Examiner* — Kendra D Carter
*Assistant Examiner* — Jaeick Jang
(74) *Attorney, Agent, or Firm* — AdamsIP, LLC; Edward Brinkley Garner, III; James Hunter Adams

(57) ABSTRACT

A system for a hyperbaric chamber with mirrored controls is disclosed. The system includes a cylindrical vessel with a mid-portion, head portion, and door portion that create an inner cavity when a door is in a closed position. The vessel is designed to maintain a pressure of at least 3 atmospheres and includes a plurality of mirrored windows for external visibility. Control panels with a housing and multiple controls are attachable to mirrored control inlets on the vessel's wall. The mirrored control inlets allow for control panels to be placed on either the interior or exterior surfaces of the vessel. The system may also include a modular design with sections secured together using flanges and gaskets to create an airtight seal. The hyperbaric chamber's mirrored controls and modular construction enhance accessibility, safety, and patient comfort, addressing space constraints and orientation limitations of current designs.

18 Claims, 8 Drawing Sheets

SYSTEM AND METHOD FOR A HYPERBARIC CHAMBER HAVING MIRRORED CONTROLS

FIELD OF THE DISCLOSURE

The subject matter of the present disclosure refers generally to a system and method for a hyperbaric chamber having mirrored controls.

BACKGROUND

Positioning hyperbaric chambers in a room is a critical aspect of ensuring the safe and effective operation of these medical devices. Several issues need to be considered when determining the appropriate placement of hyperbaric chambers to guarantee the well-being of both patients and healthcare providers. From safety concerns to practical considerations, careful planning is essential to avoid potential risks and optimize the use of these chambers. Several critical aspects of positioning a hyperbaric chamber in a room include, but are not limited to, space requirements, ventilation, electrical safety, access and egress, fire safety, noise control, patient privacy, emergency preparedness, regulatory compliance, maintenance accessibility, and potential impact on other equipment. Unfortunately, the design of currently available hyperbaric chambers makes it difficult for compliance with each of these critical aspects.

For instance, hyperbaric chambers require a significant amount of space for proper installation. Inadequate space can lead to operational difficulties, compromising the functionality and safety of the equipment. Additionally, it may be difficult or impossible to add many currently available hyperbaric chambers to certain locations due to door sizes of many buildings. And even if you do have a space large enough to house the hyperbaric chamber, you must still factor in adequate space around the chamber to allow for easy access for patients and medical personnel, especially during emergencies. Assuming one can find space adequate for housing a hyperbaric chamber, the structural integrity of the room should be carefully evaluated to support the weight of the hyperbaric chamber. Inadequate support can lead to safety hazards and structural damage to the room itself. Additionally, one must consider that structural stability of a building in areas that are used to access the space sufficient to support a hyperbaric chamber.

When the need for proper safety is considered in addition to the size/access constraints of currently available hyperbaric chamber, it further limits where one might install a hyperbaric chamber. Inadequate ventilation can lead to a buildup of heat and moisture, potentially affecting the comfort and well-being of patients undergoing treatment. Potentially worse is that the buildup of moisture and heat could cause pose a danger around electrical sources. And considering that hyperbaric chambers use large quantities of highly flammable oxygen, assessing the risk of fire is essential when positioning hyperbaric chambers. Placing them away from potential sources of ignition and ensuring the availability of fire safety equipment are crucial steps in preventing fire-related accidents. The placement of hyperbaric chambers should allow for easy access during emergencies. This includes ensuring that emergency exits are clear and accessible and that the chambers are not obstructing the path to safety. Further, adherence to regulatory standards and guidelines is paramount when positioning hyperbaric chambers. Compliance ensures that the installation meets the required safety standards and mitigates potential legal and regulatory risks, and may reduce the risk of lawsuit for a service provider.

Other factors that may affect quality of life of operators and/or patients must also be considered when placing a barometric pressure chamber. Maintaining patient privacy is essential during hyperbaric chamber treatments. Placing the chambers in areas that offer adequate privacy and confidentiality is crucial for the comfort and well-being of the patients. However, one must also consider the orientation of the windows of a hyperbaric chamber, which allow for patients to see out of the interior chamber of the hyperbaric chamber and healthcare professional or veterinarians to see inside the interior chamber. Currently available hyperbaric chambers do not have window configurations that may be reoriented, resulting in situations where the window may be facing a wall. This not only may increase the change that a patient becomes claustrophobic, but also poses a safety risk since it makes it more difficult for a healthcare professional or veterinarian to monitor the patient within the interior chamber.

Accordingly, there is a need in the art for a hyperbaric chamber that has a mirrored control system and mirrored window system to increase patient comfort and reduce medical risk. Further, there is a need in the art for a modular system that can greatly increase access to hyperbaric chambers in instances where there may be space constraints.

SUMMARY

A system and method for system and method for a hyperbaric chamber having mirrored controls is provided. In one aspect, the system allows a user to change the position of controls on a hyperbaric chamber or have multiple controls both inside and outside of the hyperbaric chamber. In another aspect, the system allows either side of a hyperbaric chamber to be positioned against a wall without limiting the functionality of the hyperbaric chamber. In yet another aspect, the system provides a hyperbaric chamber that is modular, allowing for custom length hyperbaric chambers that may also be built in areas that might otherwise be inaccessible to non-modular hyperbaric chambers. Generally, the system and methods of the present disclosure are designed to allow for highly customizable hyperbaric chambers that are not limited by space constraints in the same way that current hyperbaric chambers are. Generally, the system comprises a cylindrical vessel having mirrored control inlets 108, flow control system incorporated into said cylindrical vessel, and a control panel configured to control said flow control system. The mirrored control inlets 108 of the cylindrical vessel allow for one or more control panels to be incorporated on either side of the cylindrical vessel. The controls may be incorporated into an exterior control inlet of the cylindrical vessel and/or an interior control inlet of the cylindrical vessel.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a hyperbaric chamber having mirrored controls.

Figure 1:
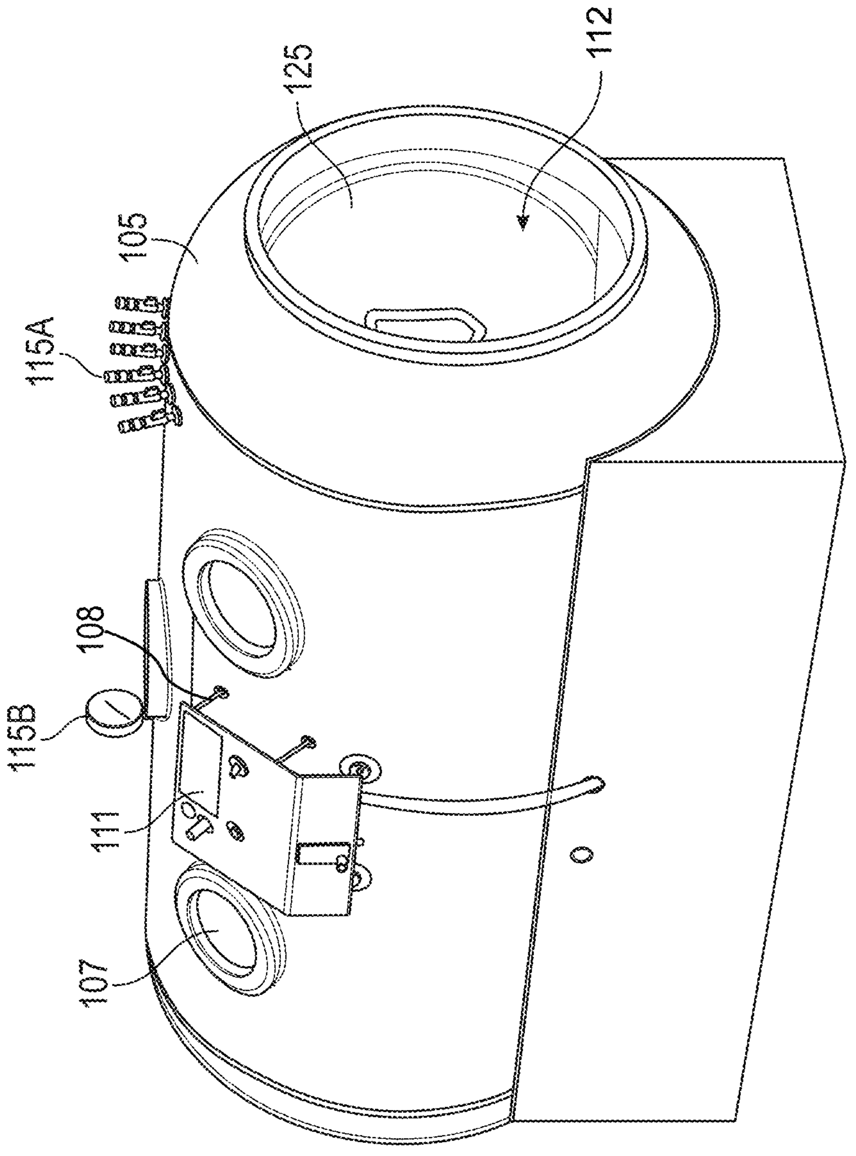
FIG. 1 illustrates a system embodying features consistent with the principles of the present disclosure.
Figure 2:
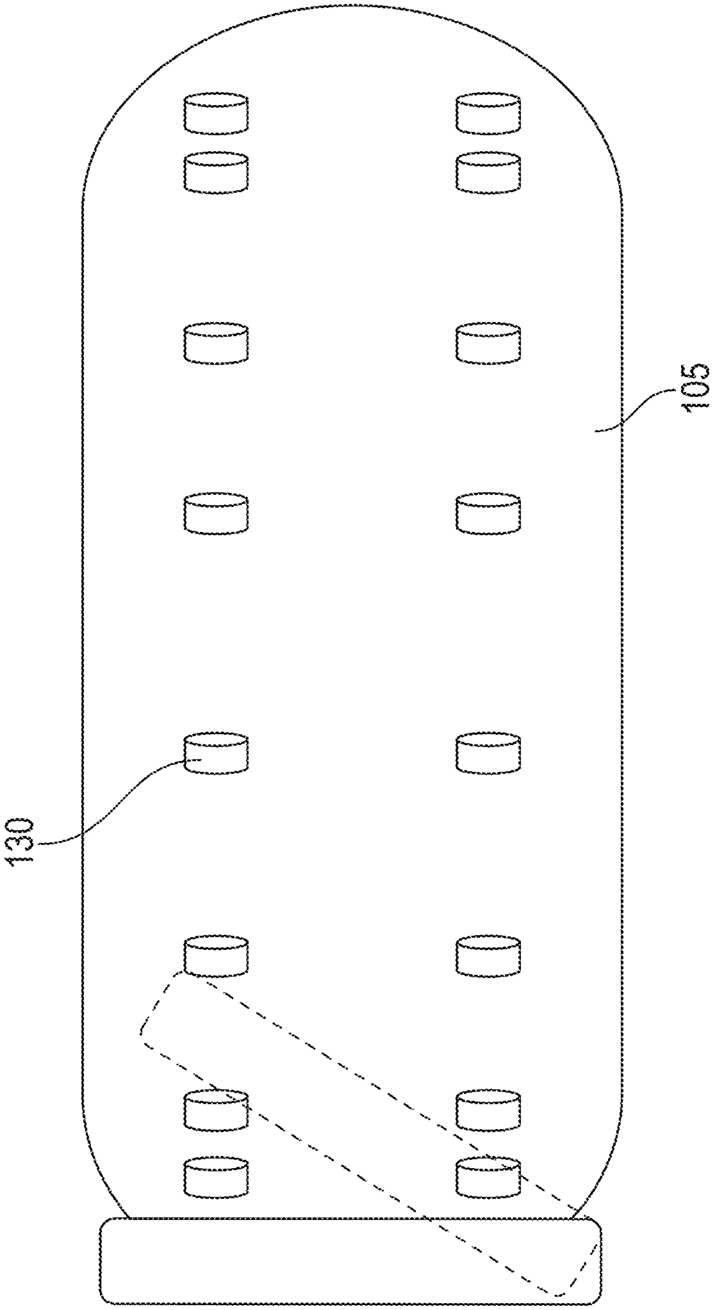
FIG. 2 illustrates a system embodying features consistent with the principles of the present disclosure.
Figure 3:
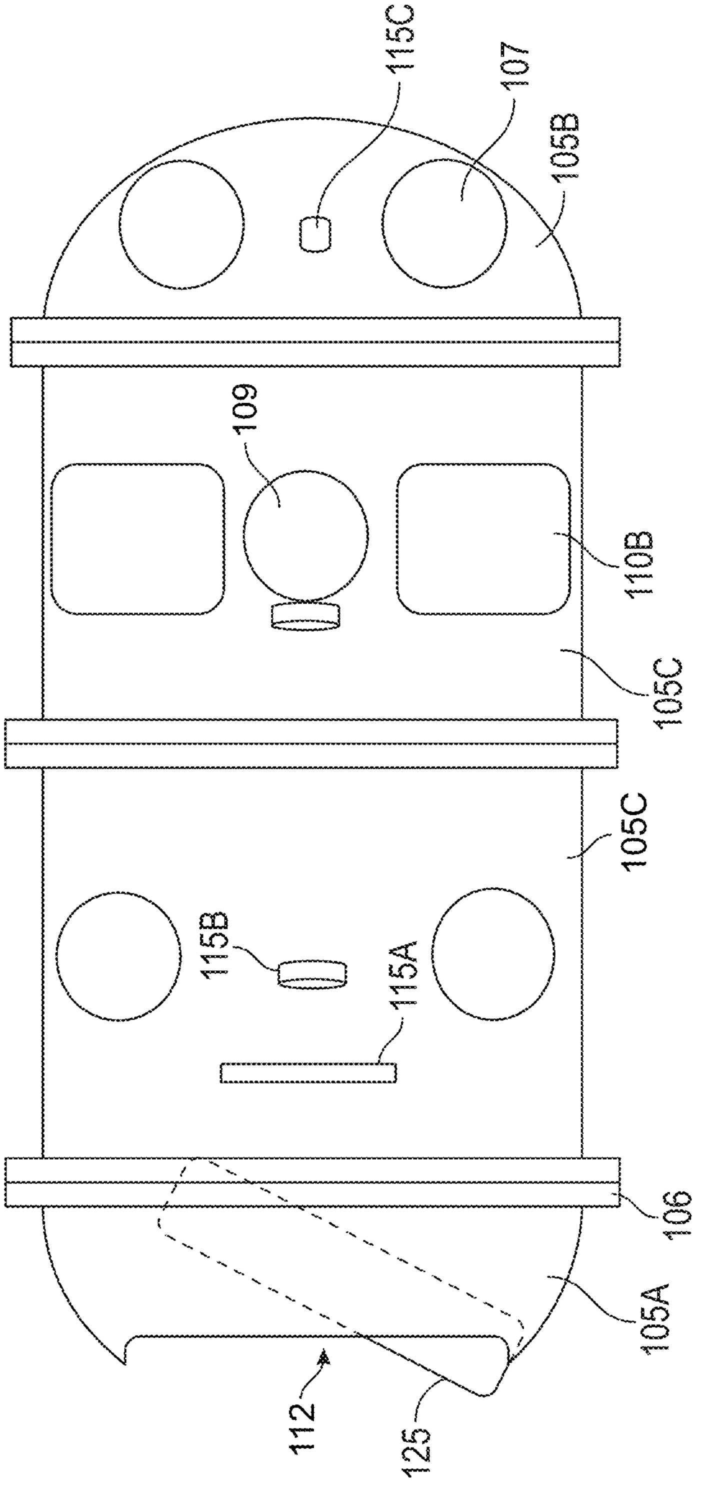
FIG. 3 illustrates a system embodying features consistent with the principles of the present disclosure.
Figure 4:
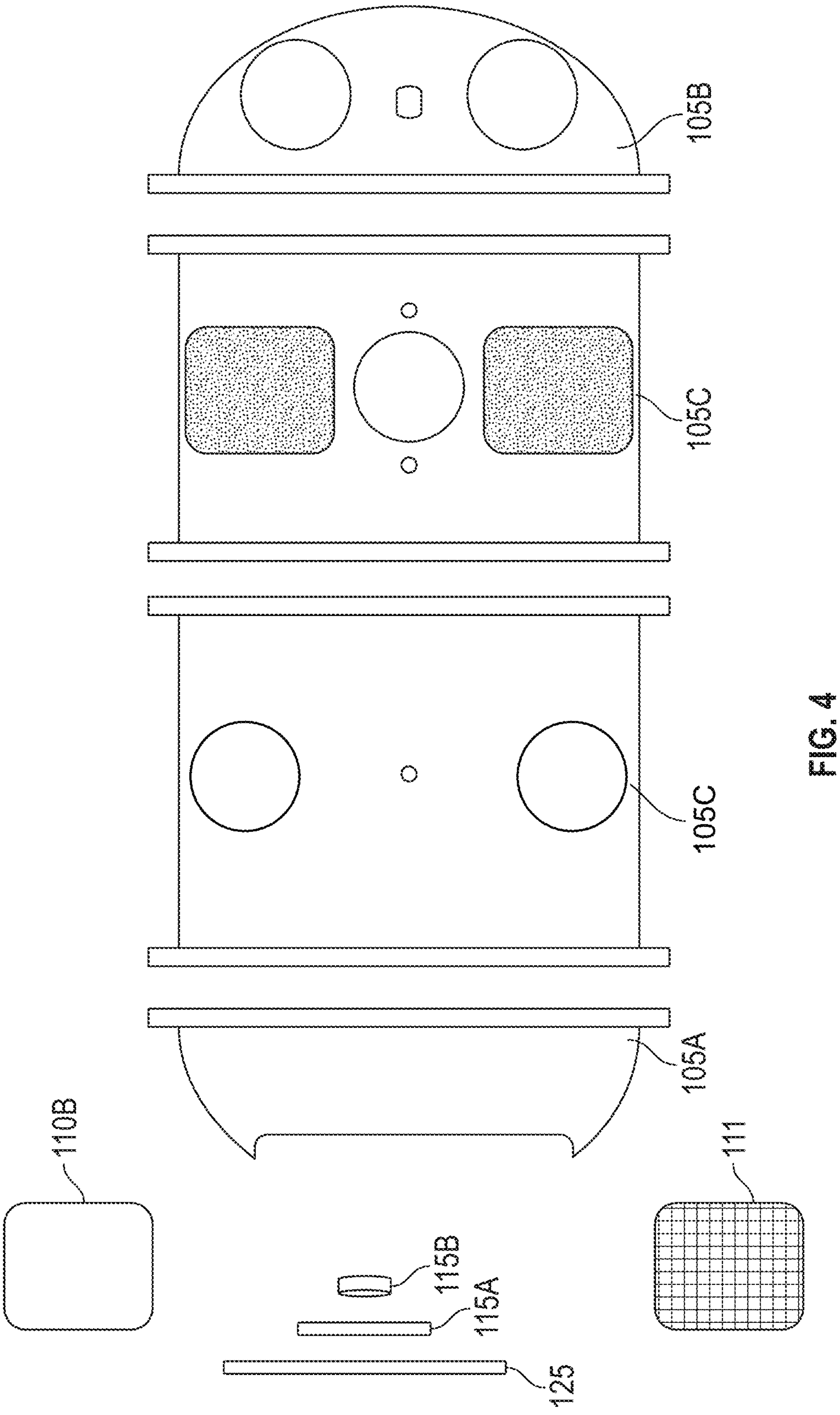
FIG. 4 illustrates a system embodying features consistent with the principles of the present disclosure.
Figure 5:
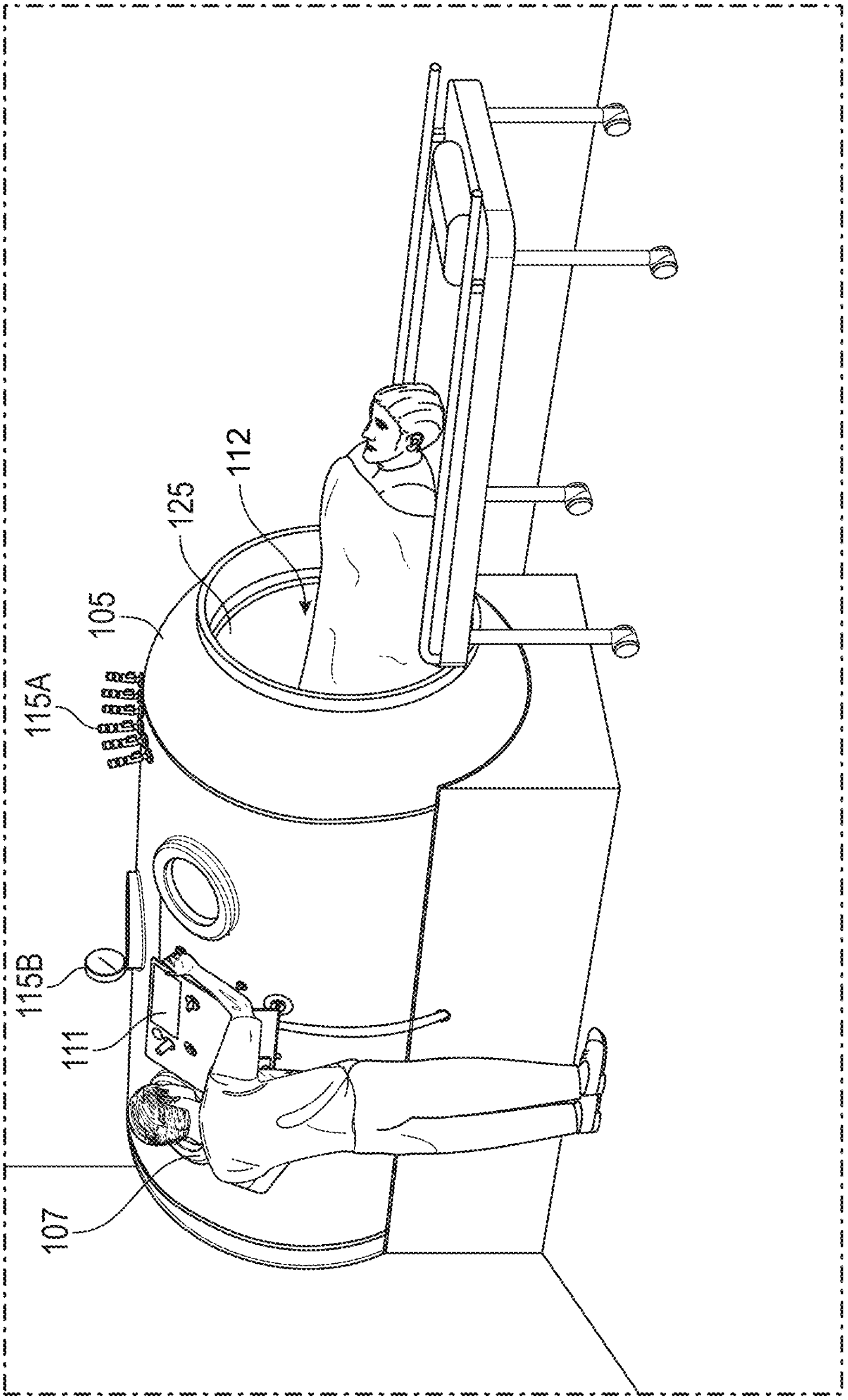
FIG. 5 illustrates a system embodying features consistent with the principles of the present disclosure.
Figure 6:
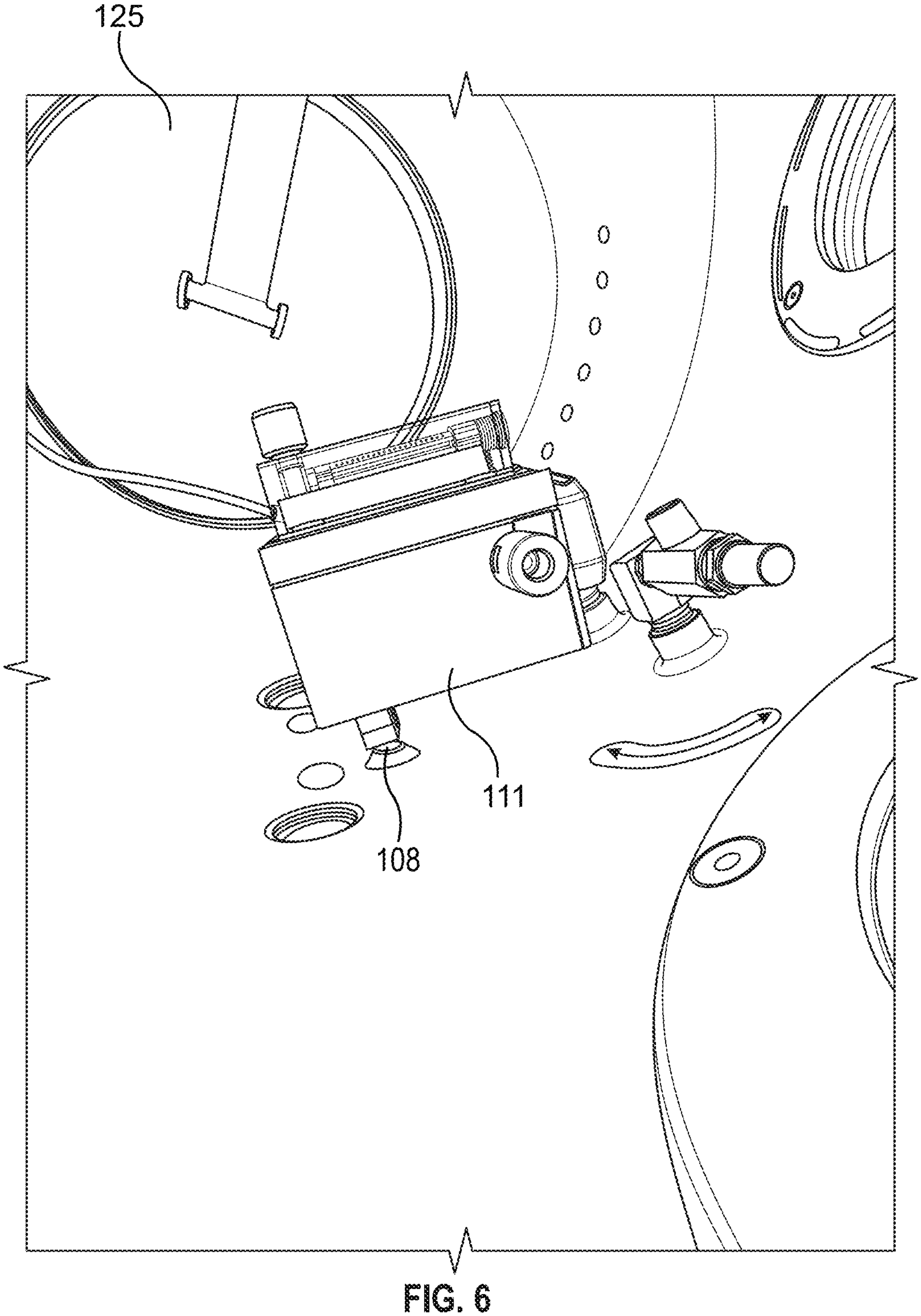
FIG. 6 illustrates a system embodying features consistent with the principles of the present disclosure.
Figure 7:
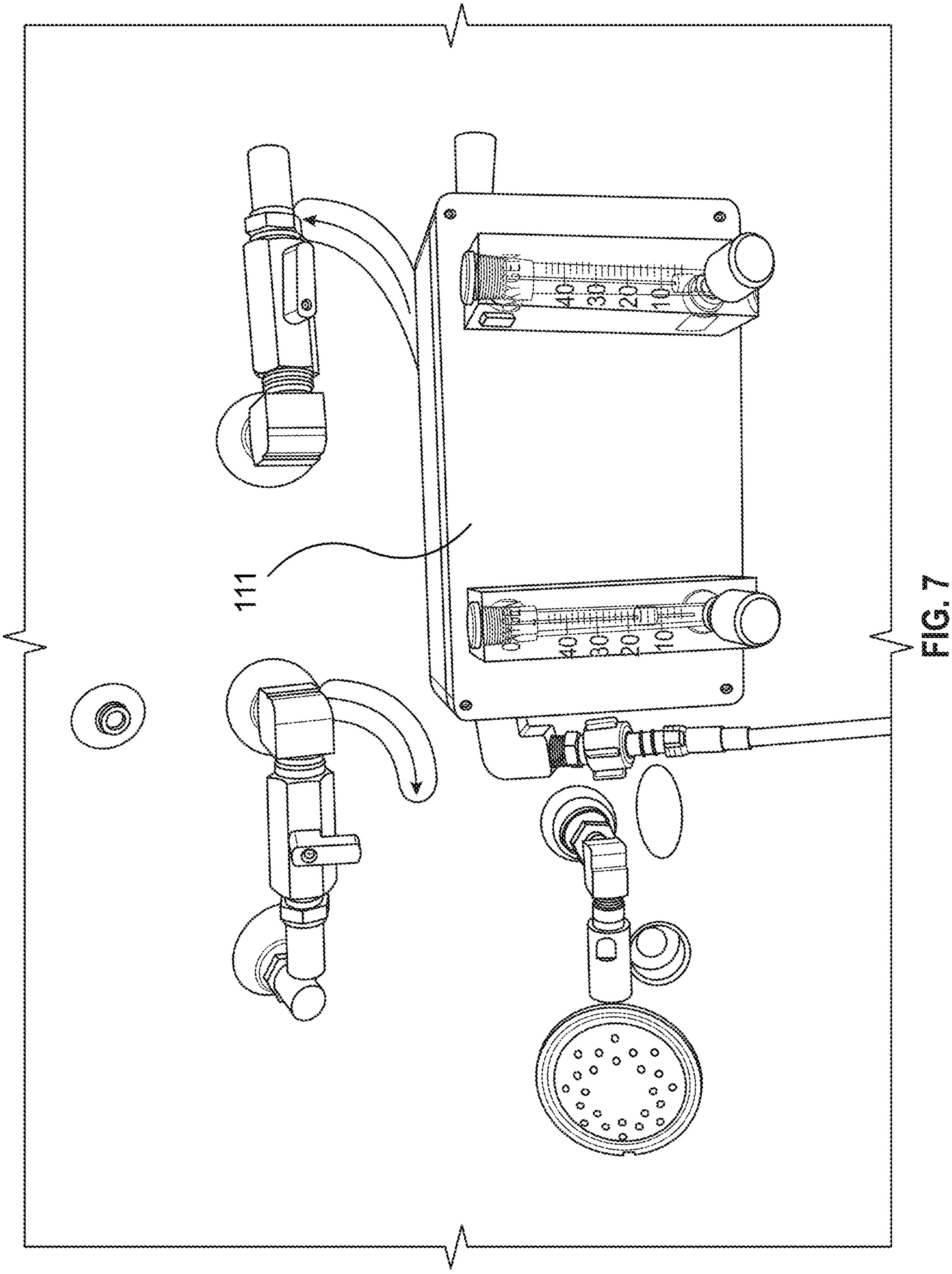
FIG. 7 illustrates a system embodying features consistent with the principles of the present disclosure.
Figure 8:
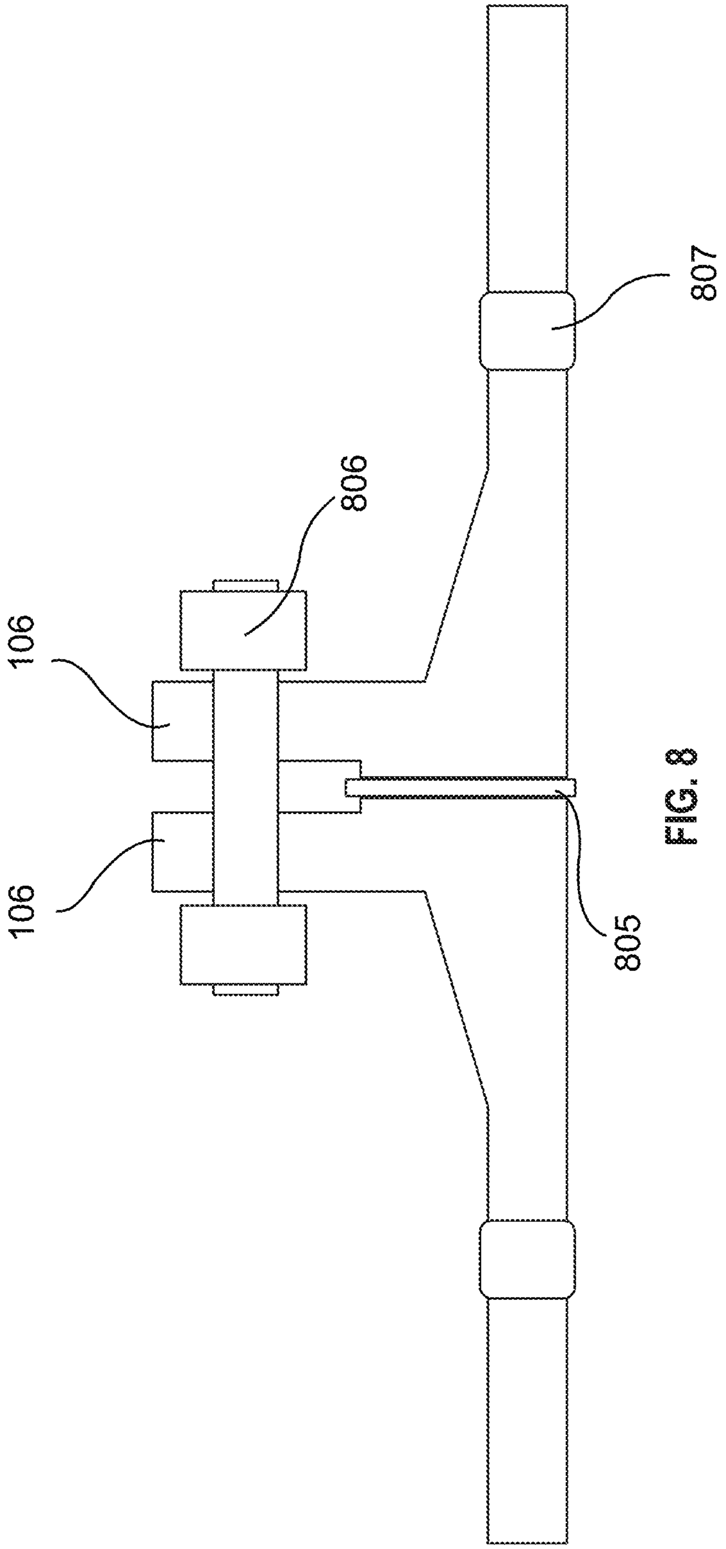
FIG. 8 illustrates a system embodying features consistent with the principles of the present disclosure.

FIGS. 1-8 illustrate embodiments of a mirrored hyperbaric chamber and how the mirrored hyperbaric chamber may be used by a user and/or operator. FIG. 1 illustrates a perspective view of a preferred embodiment of the mirrored hyperbaric chamber comprising a cylindrical vessel 105 having mirrored control inlets 108, flow control system 115A-C incorporated into said cylindrical vessel 105, and a control panel 111 configured to control said flow control system 115A-C. FIG. 2 illustrates a bottom view of a preferred embodiment of the mirrored hyperbaric chamber, wherein a plurality of wheels 130 secured to the bottom of the cylindrical vessel 105 allows for easier movement of said mirrored hyperbaric chamber. FIG. 3 illustrates a top view of a preferred embodiment of the mirrored hyperbaric chamber comprising a modular cylindrical vessel 105 having mirrored control inlets 108, flow control system 115A-C incorporated into said modular cylindrical vessel 105, and a control panel 111 configured to control said flow control system 115A-C. FIG. 4 illustrates an exploded view of a mirrored hyperbaric chamber comprising a modular cylindrical vessel 105. FIG. 5 illustrates an environmental view of a mirrored hyperbaric chamber being used by a user and/or operator. FIG. 6 illustrates a side view of controls within the interior of a mirrored hyperbaric chamber. FIG. 7 illustrates a top view of controls within the interior of a mirrored hyperbaric chamber. FIG. 8 illustrates a side view of flanges 106 used to secure together sections of a modular cylindrical vessel 105.

Generally, the system comprises a cylindrical vessel 105 having mirrored control inlets 108, flow control system 115A-C incorporated into said cylindrical vessel 105, and a control panel 111 configured to control said flow control system 115A-C. The mirrored control inlets 108 of the cylindrical vessel 105 allow for one or more control panels 111 to be incorporated on either side of the cylindrical vessel 105. The controls may be incorporated into an exterior control inlet of the cylindrical vessel 105 and/or an interior control inlet of the cylindrical vessel 105. In some preferred embodiments, the control inlets may be mirrored in a way such that an exterior control inlet and interior control inlet are located on opposite sides of the same area of the wall of the cylindrical vessel 105. Accordingly, in some preferred embodiments, the cylindrical vessel 105 may comprise multiple control inlets on the exterior and interior surfaces of the wall of the cylindrical vessel 105.

In a preferred embodiment, the cylindrical vessel 105 is configured to receive oxygen and/or pressurized air at a pressure greater than one atmosphere within an inner cavity 112. The material used to construct the cylindrical vessel 105 is preferably carbon steel; however, one with skill in the art will recognize that other materials suitable for constructing hyperbaric chambers cable of withstanding pressures of greater than three atmospheres may be used without departing from the inventive subject matter as described herein. The cylindrical vessel 105 comprises a mid-section 105C, head section 105B, and door section 105A. The head section 105B is secured to one end of the mid-section 105C. In one preferred embodiment, the wall of the mid-section 105C and the wall of the head section 105B are continuous. The door section 105A is preferably secured to the opposite end of the mid-section 105C from the head section 105B. In one preferred embodiment, the wall of the mid-section 105C and the wall of the door section 105A are continuous. An opening of the door section 105A allows for access into the inner cavity 112 created by the midportion, head section 105B, and door section 105A. A door 125 may be movably secured about the opening of the door section 105A in a way such that the door 125 may move between an open position and a closed position, wherein said door 125 allows access to the opening in the open position and seals the opening in a closed position. In a preferred embodiment, the door 125 creates an airtight seal about the opening in order to prevent gases from escaping the inner cavity 112. In some preferred embodiments, a plurality of hand wheel closures may be used to create an air-tight seal between the inner circumferential surface of the door 125 and the opening of the cylindrical vessel 105. The cylindrical vessel 105 preferably comprises a diameter between 36 inches and 48 inches and a length of at least 56 inches. The modular cylindrical vessel 105 may be configured to withstand at least 3 atmospheres of internal pressure without leaking. In a preferred embodiment, the mirrored hyperbaric chamber and its various components are configured to withstand internal pressures greater than 4 atmospheres without leaking.

In another preferred embodiment, the cylindrical vessel 105 is modular and may comprises a plurality of sections. In a preferred embodiment, the modular cylindrical vessel 105 comprises a one or more mid sections, a head section 105B, and a door section 105A. In a preferred embodiment, each mid-section 105C used to create the modular vessel is secured to at least one other mid-section 105C to create a cylindrical body section. The head section 105B is preferably secured to one end of the mid body section, and the door section 105A is preferably secured to the opposite end of the mid-body section from the head section 105B. An opening of the door section 105A allows for access into the inner cavity 112 created by the mid-body section, head section 105B, and door section 105A. A door 125 may be movably secured about the opening of the door section 105A in a way such that the door 125 may move between said open position and said closed position.

The modular cylindrical vessel 105 preferably comprises a diameter between 36 inches and 48 inches. Each mid-section 105C of a modular cylindrical vessel 105 preferably comprises a length between 28 inches and 30 inches whereas the head section 105B and door section 105A preferably each comprise a length between 14 inches and 18 inches. Accordingly, a modular cylindrical vessel 105 comprising two middle sections, a head section 105B, and a door section 105A preferably comprises a length between 84 inches and 96 inches. However, one with skill in the art will understand that the various sections may comprise other lengths without departing from the inventive subject matter described herein. For instance, a mid-section 105C may comprise a length shorter than 28 inches or greater than 30 inches without departing from the inventive subject matter described herein. Or the head section 105B and the door section 105A may comprise a length shorter than 14 inches or greater than 18 inches without departing from the inventive subject matter described herein.

The various sections of the modular cylindrical vessel 105 are preferably secured together in a way that prevents gases from escaping the inner cavity 112 created by the plurality of sections. In one preferred embodiment, the various sections of the modular cylindrical vessel 105 may be welded together until they form an air tight seal. In a preferred embodiment, high strength bolts 806 positioned in the bolt holes of the flanges 106 are used to secure the plurality of sections of the modular cylindrical vessel 105 in place. In another preferred embodiment, as illustrated in FIGS. 2-4 and 8, the mid-section 105C, head section 105B, and door section 105A may comprise one or more flanges 106, wherein said flanges 106 are oriented in a way such that may be used to secure the sections to one another. Accordingly, the flanges 106 are preferably positioned on the sections to allow for bolt holes/threads of the flanges 106 to align when the sections are positioned in a way to create the modular cylindrical vessel 105, as illustrated in FIG. 8.

Types of flanges 106 that may be used by the modular cylindrical vessel 105 include, but are not limited to, slip-on flange, welding neck flange, overlapping flange, threaded flange, socket weld flange, or any combination thereof. Additionally, in some preferred embodiments, the flanges 106 used for securing sections to one another may include different types of flange sealing surfaces, including, but not limited to, raised surfaces, flat sealing surfaces, RTJ joints, and tongue and groove flanges. In a preferred embodiment, class 150, full penetration, ASME/PVHO-1 code compliant, butt welded (welding neck flange) vertical pipe flanges with a raised face or a flat face may be used for bolted connections between the plurality of sections of the modular cylindrical vessel 105. All welds are preferably full penetration welds due to the ASME/PVHO-1 code.

In some preferred embodiments, a gasket 805 may be used between the flanges 106 to increase air tightness between the sections. The gasket 805 material is preferably selected based on its ability to compress and conform to the flange surfaces, filling any microscopic irregularities and creating a barrier against gas escape. Types of materials that may be used for the gaskets 805 include, but are not limited to, paper, rubber, silicone, metal, cork, felt, neoprene, nitrile rubber, fiberglass, polytetrafluoroethylene, and plastic polymer, or any combination thereof. In a preferred embodiment, the gasket 805 comprises metal. The flanges 106 and sections of the modular cylindrical vessel 105 are preferably constructed of steel and configured to withstand at least 3 atmospheres of internal pressure without leaking. As such, the gaskets 805 are preferably compressed between the flanges 106 of the plurality of sections by an amount that may allow for air tightness of at least 3 atmospheres, which may vary depending on the material used for the gasket 805. One with skill in the art will understand that different gasket materials may require different compression to achieve air tightness at 3 or more atmosphere.

In a preferred embodiment, the securement of the mid-section 105C, head section 105B, and door section 105A of the modular cylindrical vessel 105 is achieved through the use of a plurality of flanges 106 that have been connected via a weld 807 to said sections and are integral to the structural integrity and airtight seal of the hyperbaric chamber. These flanges 106 are precision-engineered components that are affixed to the ends of each section, designed to interlock when the sections are brought into alignment. In a preferred embodiment, the flanges 106 feature a series of bolt holes that are uniformly spaced around their perimeter, ensuring that when two sections are positioned end-to-end, the bolt holes of the adjoining flanges 106 align perfectly. This alignment is a pivotal aspect of the assembly process, as it allows for the insertion of high-strength bolts 806 that will fasten the sections together securely. To facilitate the securement process, the flanges 106 are preferably oriented with their bolt holes or threads in a matching pattern, which is consistent across all sections of the cylindrical vessel 105. This standardization of flange design ensures that any mid-section 105C can be attached to any head section 105B or door section 105A without concern for misalignment, thereby simplifying the construction and maintenance of the hyperbaric chamber. The flanges 106 themselves are robustly constructed, often made from the same high-grade steel as the vessel sections, to withstand the forces exerted by the pressurized environment within the chamber.

In a preferred embodiment, the bolting process involves aligning the flanges 106 of two sections and inserting bolts 806 through the aligned holes, which are then fastened with nuts on the opposite side. This creates a strong mechanical joint that holds the sections together under pressure. The bolts 806 are typically torqued to a specified value to ensure a consistent and reliable seal across all joints. The use of a torque wrench is recommended to achieve the precise level of tightness, preventing leaks while avoiding damage to the flange surfaces or bolt threads. In a preferred embodiment, the bolts 806 are torqued to a value great enough to prevent the escape of pressurized gas of at least 3 atmospheres within the inner cavity 112 from between the mid-section 105C and at least one of the head section 105B and/or door section 105A. As previously mentioned, in some embodiments, a gasket 805 may be used between the flanges 106 to enhance the airtight seal. The gasket 805 is preferably sized to match the flange faces, with holes that align with the bolt holes, ensuring that it remains in place during assembly. When the bolts 806 are tightened, the gasket 805 is compressed, forming the additional seal that is capable of maintaining the internal pressure of the hyperbaric chamber without any leakage.

As illustrated in FIGS. 1-8, a plurality of windows 107 is preferably incorporated into the wall of the cylindrical vessel 105 to allow for viewing into and/or out of the inner cavity 112 of the cylindrical vessel 105 when the door 125 is in the closed position. In a preferred embodiment, the plurality of windows 107 is airtight to prevent the escape of gas from the inner cavity 112 when the barometric pressure within the cylindrical vessel 105 is greater than one atmosphere. The plurality of windows 107 is preferably configured to withstand at least 3 atmospheres of internal pressure without leaking. In a preferred embodiment, the plurality of windows 107 of mid-section 105C and head section 105B are mirrored, as illustrated in FIGS. 1, 3-5, such that a user may view into the inner cavity 112 regardless of situations in which one side of the modular cylindrical vessel 105 is abutted against a wall. In another preferred embodiment, as illustrated in FIG. 4, an apex window 109 may be incorporated into the wall of the mid-section 105C and/or head section 105B at an apex point of the modular cylindrical vessel 105 to allow for a subject to view an exterior pressure gauge 115B of the flow control system 115A-C. In some preferred embodiments, a threaded port allows for the installation of a repositionable pressure gauge 115B about the plurality of windows 107 to allow a subject to view the pressure within the inner cavity 112 of the modular cylindrical vessel 105. In one preferred embodiment, two or more threaded ports may be situated about the plurality of windows 107 to allow for the repositioning of the pressure gauge 115B to suit a subject's needs. As illustrated in FIG. 4, threaded ports may be situated about a single window of the plurality of windows 107.

The plurality of windows 107 of the hyperbaric chamber may be constructed from durable materials such as acrylic, which offers clarity and resistance to high pressure. Alternatively, polycarbonate can be used for its high impact strength and ability to withstand pressure fluctuations. For enhanced safety, laminated glass, consisting of multiple layers bonded with interlayers, can be employed to prevent shattering. Tempered glass is another suitable material, known for its toughness and safety as it crumbles into small granular chunks instead of splintering into jagged shards when broken. Borosilicate glass, recognized for its thermal resistance, is also a viable option for the windows 107, ensuring stability under varying temperature conditions within the chamber. Lastly, fused silica glass may be considered for its exceptional optical clarity and resistance to high pressures, making it ideal for viewing purposes in hyperbaric environments.

As illustrated in FIG. 2, The mobility of the hyperbaric chamber is greatly enhanced by the incorporation of a plurality of wheels 130 affixed to its base, which are designed to facilitate the effortless relocation of the chamber within a facility. In a preferred embodiment, these wheels 130 are mounted on a plurality of legs that are secured to the bottom of the cylindrical vessel 105, ensuring a stable and reliable means of transport. In a preferred embodiment, the chamber utilizes caster-type wheels, which provide the advantage of 360-degree rotation, allowing for smooth and precise maneuvering in various directions. This feature is particularly beneficial in tight spaces or when navigating through corridors and doorways, as it allows for greater flexibility in the chamber's placement. The wheels 130 and legs are preferably engineered to support the weight of the chamber, ensuring safe and smooth movement without compromising the structural integrity of the vessel. The addition of mobility options underscores the hyperbaric chamber's design focus on operational efficiency and adaptability to the dynamic requirements of healthcare environments.

The amount of pressurized oxygen that flows to the mask used by the patient within the hyperbaric chamber and the pressurized air within the inner cavity 112 of the hyperbaric chamber are generally controlled by the controls of the flow control system 115A-C, which are mounted within the housing. The flow control system 115A-C may be defined as a sophisticated air flow assembly designed to regulate the introduction and maintenance of pressurized oxygen that flows to the mask used by the patient within the hyperbaric chamber and the pressurized air within the inner cavity 112 of the hyperbaric chamber. This flow control system 115A-C is integral to the operation of the hyperbaric chamber, as it ensures the precise control of environmental conditions within the inner cavity 112, which is essential for therapeutic efficacy. In a preferred embodiment, the flow control system 115A-C includes a series of inlet valves 115A, regulators, and gauges/sensors 115B that work in concert to monitor and adjust the flow of oxygen and pressurized air, maintaining the desired internal pressure levels that are therapeutic for the patient. The flow control system 115A-C is operably connected to an oxygen gas supply and air supply in a way such that it may transfer oxygen from the oxygen gas supply and into the mask and/or transfer pressurized air from the air supply and into the inner cavity 112 of the hyperbaric chamber via inlet ports of said cylindrical vessel 105. Because the cylindrical vessel 105 is air tight, the inflow of pressurized air into the inner cavity 112 of the hyperbaric chamber causes said inner cavity 112 to pressurize. The components of the flow control system 115A-C are preferably engineered to handle the high pressures involved in hyperbaric treatments.

The controls allow the user of the system to set specific parameters for each treatment session to finely tune the and/or levels and pressure within the chamber. The controls interface with the flow control system 115A-C to initiate the pressurization process, maintain steady-state conditions, and safely depressurize the chamber upon completion of the session. In some preferred embodiments, the controls may include digital displays and input devices to provide real-time feedback and adjustments, ensuring that the hyperbaric chamber operates within the prescribed therapeutic ranges. FIGS. 1 and 5 illustrate an embodiment having controls secured to the exterior of the wall of the mid-section 105C whereas FIGS. 6 and 7 illustrate an embodiment having controls secured to the interior of the wall of the mid-section 105C. In some preferred embodiments, controls may be secured to the wall of the mid-section 105C both internally and externally.

In a preferred embodiment, safety features may be embedded within the flow control system 115A-C to protect both the patient and the chamber from over-pressurization or other potential hazards. Types of safety features that may be included in the flow control system 115A-C include, but are not limited to, overpressure relief safety valves 115C, emergency shut-off mechanisms, and alarms that activate when parameters exceed safe limits. In a preferred embodiment, the flow control system 115A-C is designed to be fail-safe, automatically taking corrective action if abnormal conditions are detected. In one preferred embodiment, the flow control system 115A-C is operably connected to an outlet port of the cylindrical vessel 105 in a way such that the flow control system 115A-C may remove air from the inner cavity 112 of the cylindrical vessel 105, thus causing the inner cavity 112 to depressurize. In another preferred embodiment, the cylindrical vessel 105 may comprise a over pressure relief safety valve 115C, which may allow a user to quickly depressurize the inner cavity 112 of the cylindrical vessel 105. Accordingly, safety features may be used to ensure that the hyperbaric chamber remains a secure environment for patients throughout the duration of their treatment, providing peace of mind for healthcare providers and patients alike.

As previously mentioned, the control panel 111 is preferable secured to the interior surface and/or exterior surface of the wall of the cylindrical vessel 105 via a control inlet. The control inlet preferably comprises inlet ports that may be used to secure the control panel 111. In a preferred embodiment, the control panel 111 comprises a housing and a plurality of controls, wherein the housing is configured to secure to the control inlet of cylindrical vessel 105. In embodiments comprising mirrored control inlets 108, an inlet plate 110B may be used to cover a control inlet having no housing secured thereto. In a preferred embodiment, steel plugs may be inserted into control ports of a control inlet not having a control panel 111 secured thereto.

The mirrored control inlets 108 are a pivotal feature of the cylindrical vessel 105, designed to enhance the flexibility and functionality of the hyperbaric chamber. In a preferred embodiment these inlets are strategically positioned on the interior and/or exterior surfaces of the chamber wall such that they mirror one another, allowing for the attachment of control panels 111 on either side. Accordingly, the mirrored arrangement of the control inlets means that for every control inlet on one side of the wall, there is a corresponding inlet directly opposite on the other side, ensuring that the functionality is not hindered regardless of the chamber's orientation within a room. Further, this dual placement capability ensures that controls can be accessed from within the chamber by a patient and/or operator as well as from the outside by a patient and/or operator. Therefore, mirrored controls address the challenge of limited space and specific room configurations since the hyperbaric chamber can be positioned with either side against a wall while still maintaining full operational control.

In a preferred embodiment, the housing of the control panel 111 is designed to interface seamlessly with the control inlet, ensuring a secure attachment that is both robust and user-friendly. Each control inlet is preferably equipped with a standardized mounting system, which includes a series of inlet ports strategically positioned to align with corresponding attachment points on the housing of the control panel 111. The inlet ports may feature threaded interiors or other mechanical fastening systems, such as quick-release latches or locking mechanisms, to facilitate a secure and reversible connection. This design allows for the control panel 111 to be attached or detached with ease, providing flexibility in the configuration and maintenance of the hyperbaric chamber's control systems.

To enhance the versatility of the hyperbaric chamber, the control panel 111 housing is preferably constructed with a modular attachment interface that is compatible with the mirrored control inlets 108 on both the interior and exterior surfaces of the cylindrical vessel 105. The housing includes a backplate with multiple pre-formed attachment points that correspond to the inlet ports on the control inlets. When installing the control panel 111, the backplate is positioned against the control inlet, and fasteners are inserted through the attachment points into the inlet ports, securing the housing in place. This arrangement ensures that the control panel 111 remains firmly attached during operation, while also allowing for quick removal or repositioning of the control panel 111 to another mirrored control inlet as desired, thereby maintaining the functionality and accessibility of the hyperbaric chamber's controls.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system for a hyperbaric chamber having mirrored controls comprising:

a cylindrical vessel having a mid-portion, head portion, and door portion, wherein said mid-portion, head portion, and door portion are secured together in a way that creates an inner cavity when a door of said door portion is in a closed position, wherein said closed position of said door seals an opening of said door portion, wherein said cylindrical vessel maintains a pressure of at least 3 atmospheres when said door is within said closed position, wherein said cylindrical vessel has a diameter of at least 36 inches and a length of at least 36 inches, wherein a plurality of mirrored windows allows a subject within said inner cavity to see to an exterior area of said cylindrical vessel, a control panel comprising a housing and a plurality of controls, wherein said housing of said control panel is configured to secure to a control inlet of a plurality of control inlets, wherein each control inlet of said plurality of control inlets is mirrored by at least one other said control inlet, and a panel configured to secure to each said control inlet of said plurality of control inlets when said control panel is not secured to said control inlet.

2. The system of claim 1, wherein said plurality of control inlets are located on an exterior surface of a wall of said cylindrical vessel.

3. The system of claim 1, wherein said plurality of control inlets are located on an interior surface of a wall of said cylindrical vessel.

4. The system of claim 1, wherein said plurality of control inlets are located on an exterior surface and an interior surface of a wall of said cylindrical vessel.

5. The system of claim 1, further comprising an apex window located between two of said plurality of mirrored windows.

6. The system of claim 1, wherein said mid-portion, head portion, and door portion comprise at least one mid-section, a head-section, and a door section, wherein said at least one mid-section, head section, and door section are secured via a plurality of flanges, wherein said plurality of flanges are oriented in a way such that at least one of bolt holes or threads of said plurality of flanges align.

7. The system of claim 6, further comprising a gasket configured to create an air tight seal between said at least one mid-section, head-section, and door section.

8. The system of claim 1, further comprising a plurality of inlet ports of said control inlet, wherein said housing of said control panel is configured to secure to said cylindrical vessel via said plurality of inlet ports.

9. The system of claim 8, further comprising a plurality of plugs, wherein said plurality of plugs fill said plurality of inlet ports of each said control inlet of said plurality of control inlets when said control panel is not secured to said control inlet.

10. A system for a hyperbaric chamber having mirrored controls comprising:

a cylindrical vessel having at least one mid-section, a head section, and a door section, wherein said at least one mid-section, head section, and door section are secured together in a way that creates an inner cavity when a door of said door section is in a closed position, wherein said door seals an opening of said door section when in said closed position, wherein said cylindrical vessel maintains a pressure of at least 3 atmospheres when said door is within said closed position, wherein a plurality of mirrored windows allows a subject within said inner cavity to see to an exterior area of said cylindrical vessel, a mirrored control panel comprising a housing and a plurality of controls, wherein said housing of said mirrored control panel is configured to secure to a mirrored control inlet of a plurality of mirrored control inlets, wherein each mirrored control inlet of said plurality of mirrored control inlets is mirrored by at least one other said mirrored control inlet, wherein said plurality of mirrored control inlets are located on an exterior surface of a wall of said cylindrical vessel, and a panel configured to secure to each said mirrored control inlet of said plurality of mirrored control inlets when said mirrored control panel is not secured to said mirrored control inlet.

11. The system of claim 10, wherein said plurality of mirrored control inlets is further located on an interior surface of a wall of said cylindrical vessel.

12. The system of claim 10, further comprising an apex window located between two of said plurality of mirrored windows.

13. The system of claim 10, wherein said at least one mid-section, head section, and door section are secured via a plurality of flanges, wherein said plurality of flanges are oriented in a way such that at least one of bolt holes or threads of said plurality of flanges align.

14. The system of claim 13, further comprising a gasket configured to create an air tight seal between said at least one mid-section, head-section, and door section.

15. The system of claim 10, further comprising a plurality of inlet ports of said mirrored control inlet, wherein said housing of said mirrored control panel is configured to secure to said cylindrical vessel via said plurality of inlet ports.

16. The system of claim 15, further comprising a plurality of plugs, wherein said plurality of plugs fill said plurality of inlet ports of each said mirrored control inlet of said plurality of mirrored control inlets when said mirrored control panel is not secured to said mirrored control inlet.

17. A system for a hyperbaric chamber having mirrored controls comprising:

a cylindrical vessel having at least one mid-section, a head section, and a door section, wherein said at least one mid-section, head section, and door section are secured together in a way that creates an inner cavity when a door of said door section is in a closed position, wherein said door seals an opening of said door section when in said closed position, wherein said cylindrical vessel maintains a pressure of at least 3 atmospheres when said door is within said closed position, wherein a plurality of mirrored windows and an apex window allows a subject within said inner cavity to see at least one pressure gauge mounted to an exterior surface of said cylindrical vessel, a mirrored control panels comprising a housing and a plurality of controls, wherein said mirrored control panel is mounted to said cylindrical vessel via a plurality of control inlets located on an interior surface of a wall of said cylindrical vessel, wherein each control inlet of said plurality of control inlets is mirrored by at least one other said control inlet, wherein a plurality of inlet ports of said plurality of control inlets allows for said housing to be secured to said wall of said cylindrical vessel, a panels configured to secure to said plurality of control inlets when said mirrored control panels are not secured to said plurality of control inlets, and a plurality of plugs configured to fill said plurality of inlet ports of said plurality of control inlets when said mirrored control panel is not secured to said plurality of control inlets.

18. The system of claim 17, wherein said plurality of control inlets is further located on an exterior surface of said wall of said cylindrical vessel.

* * * * *